(12) United States Patent
Cheng

(10) Patent No.: US 9,096,250 B2
(45) Date of Patent: Aug. 4, 2015

(54) FOLDABLE STROLLER AND FOLDING DEVICE THEREOF

(71) Applicant: Dongguan Wenjian Golf Products Co., Ltd., Dongguan (CN)

(72) Inventor: Yu-Chu Cheng, Dongguan (CN)

(73) Assignee: DONGGUAN WENJIAN GOLF PRODUCTS CO., LTD., Dongguan, Guangdong (CN)

( * ) Notice: Subject to any disclaimer, the term of this patent is extended or adjusted under 35 U.S.C. 154(b) by 0 days.

(21) Appl. No.: 14/446,831

(22) Filed: Jul. 30, 2014

(65) Prior Publication Data

US 2015/0076777 A1 Mar. 19, 2015

(30) Foreign Application Priority Data

Sep. 17, 2013 (CN) .......................... 2013 1 0425388

(51) Int. Cl.
*B62B 1/00* (2006.01)
*B62B 7/06* (2006.01)
*B62B 7/08* (2006.01)

(52) U.S. Cl.
CPC ................. *B62B 7/068* (2013.01); *B62B 7/062* (2013.01); *B62B 7/086* (2013.01)

(58) Field of Classification Search
USPC ......... 280/33.993, 47.38, 639–642, 643–644, 280/647–648, 649–650, 658
See application file for complete search history.

(56) References Cited

U.S. PATENT DOCUMENTS

| 5,288,098 | A | * | 2/1994 | Shamie | 280/642 |
| 6,830,254 | B2 | * | 12/2004 | Lan | 280/47.4 |
| 8,474,836 | B2 | * | 7/2013 | Yang et al. | 280/47.371 |

* cited by examiner

*Primary Examiner* — John Walters
*Assistant Examiner* — James Triggs
(74) *Attorney, Agent, or Firm* — Shimokaji & Associates, P.C.

(57) ABSTRACT

A foldable stroller includes a linkage and an engaging mechanism; the linkage includes a slider connected to the rear frame, a pull rod connected between the slider and the upper frame, and/or between the slider and the lower frame, and struts whose middles are pivoted each other, with two ends of each strut connected to the rear frame, and the sliders connected to the struts so as to actuate the struts to pivot each other; and the engaging mechanism is formed on the rear frame to restrict a sliding motion of the slider. The structure is simple and handy, and the stroller can be folded due to the gravity of the upper and lower frames when operating the engaging mechanism, which needs small strength of the user.

12 Claims, 12 Drawing Sheets

FOLDABLE STROLLER AND FOLDING DEVICE THEREOF

RELATED APPLICATIONS

This application claims the benefit of priority to Chinese Patent Application No. 201310425388.5, filed on Sep. 17, 2013, which is hereby incorporated by reference in its entirety.

FIELD OF THE INVENTION

The present invention relates to a foldable stroller and, more particularly to a handy foldable stroller and a folding device thereof.

BACKGROUND OF THE INVENTION

It's usual for parents to carry babies outdoors for taking a walk or shopping, and a carrier for carrying the baby such as a stroller is bulky however, which is inconvenient to carry. Therefore, some improved strollers with foldable function are developed in the market, which is unfolded for carrying the baby while in use and folded to reduce the bulk while out of use.

Most of current foldable strollers need both hands to fold or unfold, which need to fold for several times to complicate the operation. Specially, it's much inconvenient if there is only one baby caregiver who must carry the baby in one hand and could not fold the stroller in the other single hand. Furthermore, large strength should be applied to the conventional stroller in order to fold it; it's impracticable for a thin baby-caregiver.

Thus, there is a need for a handy foldable stroller to overcome the above-mentioned drawbacks.

SUMMARY OF THE INVENTION

One objective of the present invention is to provide a foldable stroller with improved structure, which can be folded with single hand with smaller force applied, and the operation is simple and handy.

To achieve the above-mentioned objectives, a foldable stroller includes an upper frame, a lower frame, a rear frame, with a lower end of the upper frame and an upper end of the lower frame pivotally connected to the rear frame respectively, a linkage, and an engaging mechanism. The linkage comprises a slider connected to the rear frame, a pull rod connected between the slider and the upper frame, and/or between the slider and the lower frame, and struts whose middles are pivoted each other, with two ends of each strut connected to the rear frame, and the slider connected to the strut so as to actuate the struts to pivot each other. The engaging mechanism is formed on the rear frame to restrict sliding of the slider.

In comparison with the prior art, the foldable stroller of the present invention can be kept in an unfolded position due to the sliding motion of the slider is restricted by the engaging mechanism. When folds, the slider is released by actuating the engaging mechanism, so that the upper frame and the lower frame are pivoted to fold due to the gravity, thereby folding the stroller in the vertical direction; meanwhile, the slider slides downwards under actuation of the pull rods, and accordingly the struts are pivoted to fold, thereby folding the stroller in the horizontal direction. The structure of the present invention is simple and handy, it's just needed to actuate the engaging mechanism, and the stroller can be folded due to the gravity of the upper and lower frames, which needs small strength of the user.

Preferably, the linkage further comprises a bracket which is pivotally connected between the slider and the strut. Thereby, the bracket is pivoted under the actuation of the slider, which causes the struts pivot each other to fold.

Specifically, one end of each strut is pivotally connected to the rear frame, and the other end is pivotally connected to the rear frame via a pivoting rod, and the pivoting rod and bracket are symmetrical with a pivot point of the middles of the struts. Such an arrangement makes the pivoting of the struts more stable.

Preferably, the engaging mechanism comprises a fastener fixed on the rear frame and a latch pivotally connected to the fastener, and the latch is pivoted about the fastener to press against the slider. When the latch is actuated to pivot, the latch disengages from the slider, so that the slider can slide on the rear frame, thereby the stroller can be folded easily and handily.

Preferably, a spring element is set between the fastener and the latch, so as to keep a trend of the latch pressing against the slider. The stroller can be kept in the unfolded position due to the spring element.

Preferably, the fastener is located above the slider, an upper end of the latch is pivotally connected to the fastener, and a lower end of the latch is provided with a hook for hooking the slider to restrict its gravitational sliding motion.

Preferably, the stroller further includes an actuator connected to the two latches at two sides to permit a gravitational sliding motion of the sliders. Thereby, the user may actuate two latches to disengage the sliders as far as operates one actuator.

Preferably, the actuator is composed of flexible material.

Accordingly, a folding device, being applicable to a foldable stroller comprising an upper frame, a lower frame, and a rear frame, with a lower end of the upper frame and an upper end of the lower frame pivotally connected to the rear frame respectively, and the folding device comprises a linkage and an engaging mechanism. The linkage comprises a slider connected to the rear frame, a pull rod connected between the slider and the upper frame, and/or between the slider and the lower frame, and struts whose middles are pivoted each other, with two ends of each strut connected to the rear frame, and the slider connected to the strut so as to actuate the struts to pivot each other. The engaging mechanism is formed on the rear frame to restrict sliding of the slider.

In comparison with the prior art, the folding device of the present invention can keep the stroller in an unfolded position due to the sliding of the slider is restricted by the engaging mechanism. When folds, the slider is released by actuating the engaging mechanism, so that the upper frame and the lower frame are pivoted to fold due to the gravity, thereby folding the stroller in the vertical direction; meanwhile, the slider slides downwards under actuation of the pull rods, and accordingly the struts are pivoted to fold, thereby folding the stroller in the horizontal direction. The structure of the present invention is simple and handy, it's just needed to actuate the engaging mechanism, and the stroller can be folded due to the gravity of the upper and lower frames, which needs small strength of the user.

Preferably, the linkage further comprises brackets each of which is pivotally connected between the slider and the strut. Thereby, the bracket is pivoted under the actuation of the slider, which causes the struts pivot each other to fold.

Preferably, the engaging mechanism comprises a fastener fixed on the rear frame and a latch pivotally connected to the fastener, and the latch is pivoted about the fastener to press against the slider. When the latch is actuated to pivot, the latch disengages from the slider, so that the slider can slide on the rear frame, thereby the stroller can be folded easily and handily.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

A distinct and full description of the technical solution of the present invention will follow by combining with the accompanying drawings.

Figure 1:
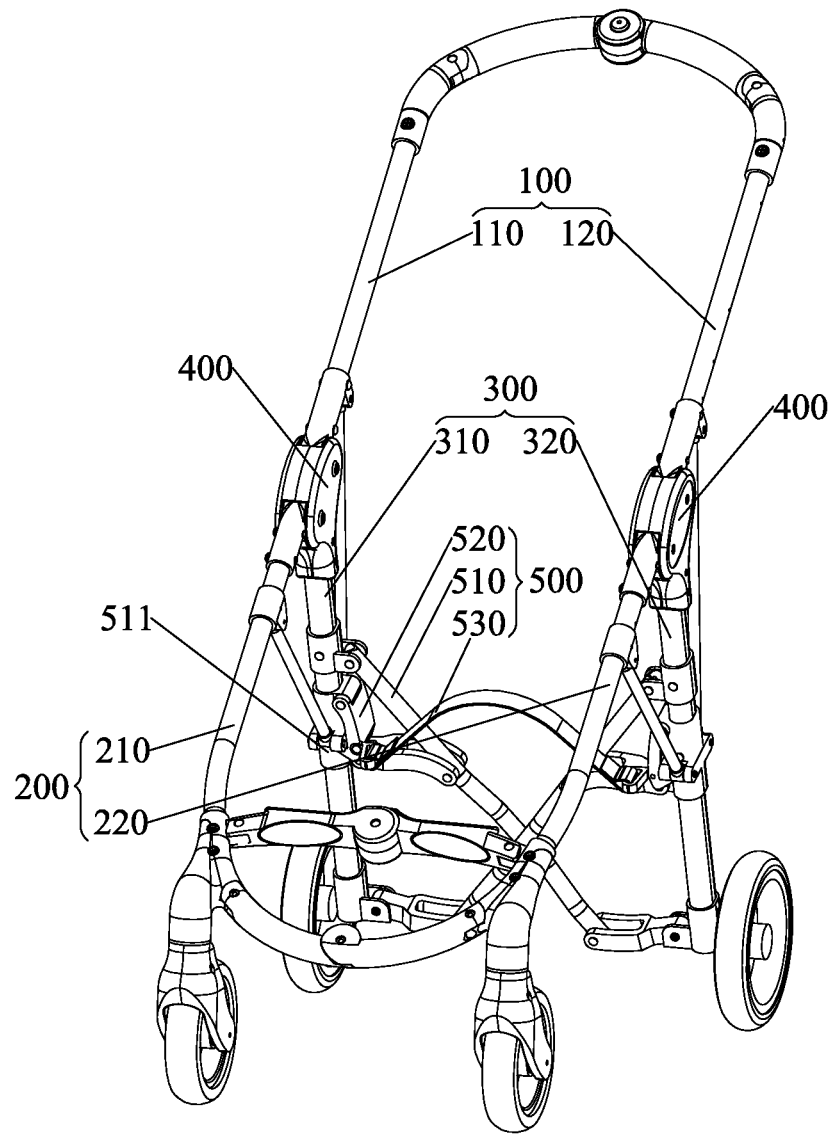
FIG. 1 is a perspective view of a foldable stroller according to one embodiment of the present invention.

Referring to FIG. 1, the foldable stroller according to one embodiment of the present invention includes an upper frame 100, a lower frame 300, a rear frame 300, at least one folding joint 400 and a folding device 500. The upper frame 100 includes a left upper frame 110 and a right upper frame 120 which are formed as symmetrical inverse L-shape, and the left upper frame 110 is pivotally connected to the upper end of the right upper frame 120. The lower frame 200 includes a left lower frame 210 and a right lower frame 220 which are formed as symmetrical L-shape, and the left lower frame 210 is pivotally connected to the right lower frame 220. The rear frame 300 includes a left rear frame 310 and a right rear frame 320 which are located at sides of the upper frame 100 and lower frame 200 respectively. Concretely, the left upper frame 110 and the left lower frame 210 are connected to the left rear frame 310 via a folding joint 400, and the right upper frame 120 and the right lower frame 220 are connected to the right rear frame 320 via another folding joint 400, so that the upper frame 100 and the lower frame 200 can be pivoted relative to the rear frame 300. The folding device 500 is located between the left rear frame 310 and the right rear frame 320, so as to make the upper frame 100 and the lower frame 200 pivoted relative to the rear frame 300.

Referring to FIGS. 2-12, the folding device 500 includes a linkage 510, an engaging mechanism 520 and an actuator 530. Concretely, the linkage 510 includes a slider 511, a pull rod 512, a strut 513, a bracket 514 and a pivoting rod 515. The engaging mechanism 520 includes a fastener 521, a latch 522 and a spring element 523.

It should be noted that, the amount of the linkage 510 is two, which are set at two sides of the stroller, preferably, and the amount of the engaging mechanism 520 also is two accordingly. For simplifying, descriptions and explanations for theses elements are combined, which should not be limited in this embodiment however.

Figure 2:
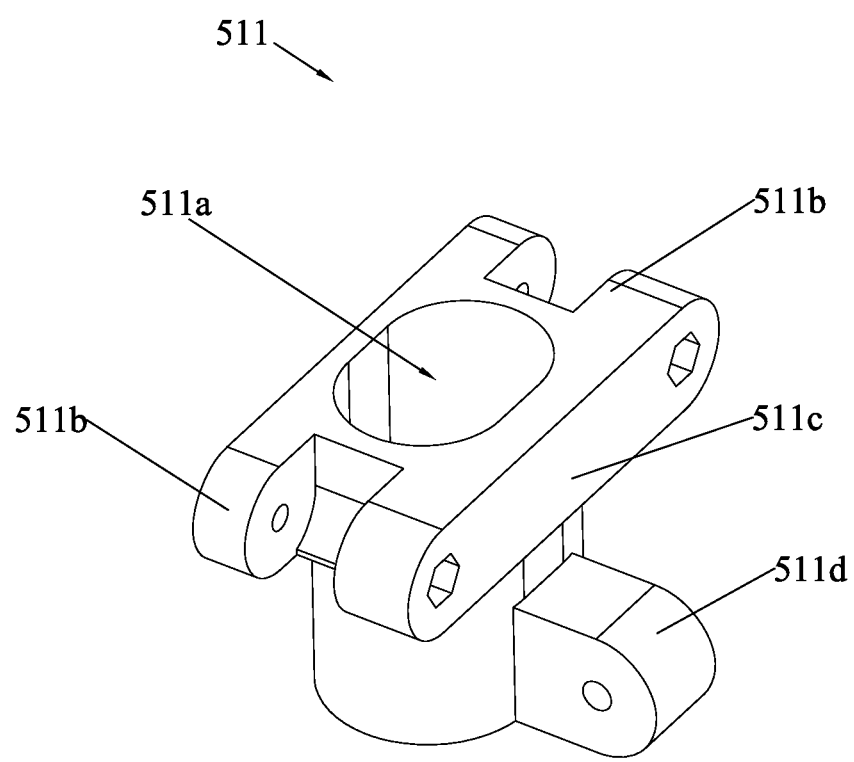
FIG. 2 is a perspective view of a slider.

As shown in FIG. 2, the slider 511 has an insert hole 511a provided on the center thereof, by which the slider 511 is sleeved on the rear frame 300. Two first connecting portions 511b are extended outwards from two sides of the slider 511 respectively, and each of them is pivotally connected to the upper frame 100 or the lower frame 200 via the pull rod 512. When the upper frame 100 and the lower frame 200 are pivoted about the rear frame 300, the pull rod 512 will be actuated, and then the slider 511 will be slid along the rear frame 300, so that the stroller could be folded in a vertical direction or unfolded. Furthermore, as shown in FIG. 2, a positioning block 511c is formed between the two first connecting portions 511b and protruded from sides of the slider 511.

Middles of the two struts 513 are pivoted at point P, concretely two ends of each strut 513 is connected to the left rear frame 310 and the right rear frame 320 respectively, and the slider 511 is connected to the struts 513 to actuate them to pivot. More specifically, the upper end of each strut 513 is connected to the left rear frame 310 or the right rear frame 320, and the lower end of each strut 513 is connected to the left rear frame 310 or the right rear frame 320 via one pivoting rod 515. And the bracket 514 is connected between the strut 513 and the slider 511 and located above the pivot point P of the struts 513, and the bracket 514 and the pivoting rod 515 are symmetrical with the pivot point P. Furthermore, as shown in FIG. 2, the slider 511 is extended to the strut 513 to form a third connecting portion 511d which is used for connected to the bracket 514. When the slider 511 slides on the rear frame 300, the bracket 514 pivoted thereon will be actuated, and then the two struts 513 are pivoted towards each other, and subsequently the bracket 514 and the pivoting rod 515 are pivoted towards each other, as a result the left rear frame 310 and the right rear frame 320 close each other or go away from each other, thereby folding the stroller in a horizontal direction or unfolding it.

The fastener 521 is sleeved on the rear frame 300 fixedly, and located above the slider 511. The latch 522 is positioned at inner side of the left rear frame 310 and the right rear frame 320, whose upper end is pivotally connected to the fastener 521. Concretely, the latch 522 has a hook 522a provided on the lower end thereof for hooking underside of the positioning block 511c when the latch 522 is closed to the slider 511 in an unfolded position of the stroller. At this time, the underside of the fastener 521 is attached on the upside of the slider 511. As a result, sliding of the slider 511 on the rear frame 300 is restricted, so that the unfolding position of the stroller can be maintained. Further, a spring element 523 is formed between the latch 522 and the fastener 521 and located beneath the pivot of therebetween, which keeps a trend of the latch 522 urging against the positioning block 511c, thereby maintaining the status of the hook 522a urging against the positioning block 511c, so as to keep the stroller in a stable unfolded position.

The actuator 530 is a flexible element, whose ends are connected to the latch 522 respectively. Concretely, the connection position of the actuator 530 and the latch 522 is located beneath the pivot of the latch 522 and the fastener 521.

Folding process of the foldable stroller will be described by combined with FIGS. 1-12 as following.

Figure 3:
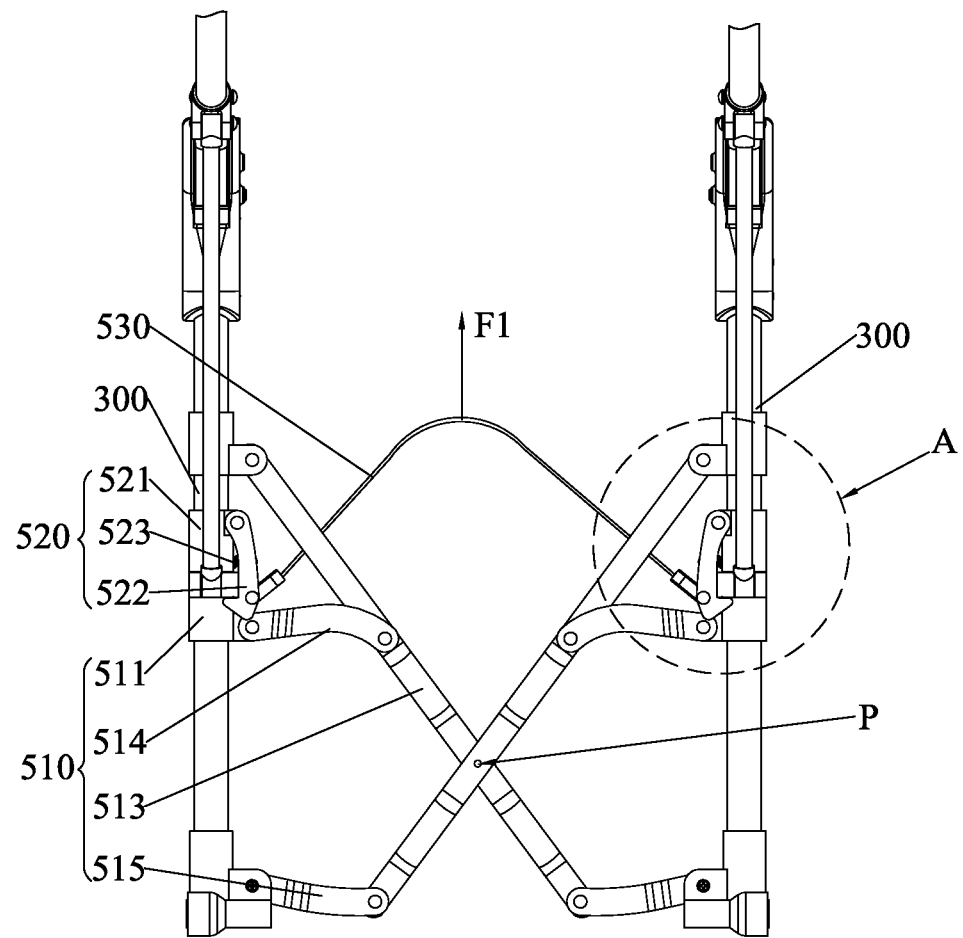
FIG. 3 is a partial front view of the foldable stroller in an unfolded position according to one embodiment of the present invention.
Figure 4:
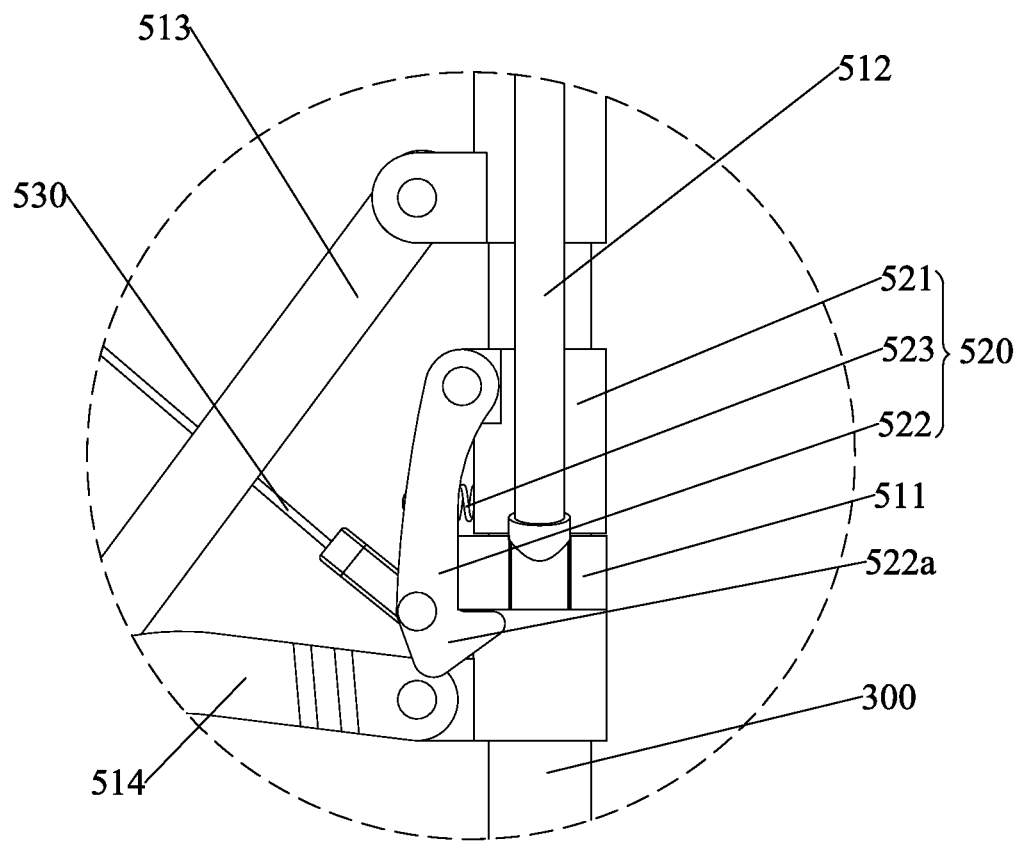
FIG. 4 is an enlarged view of the portion A in FIG. 3.
Figure 5:
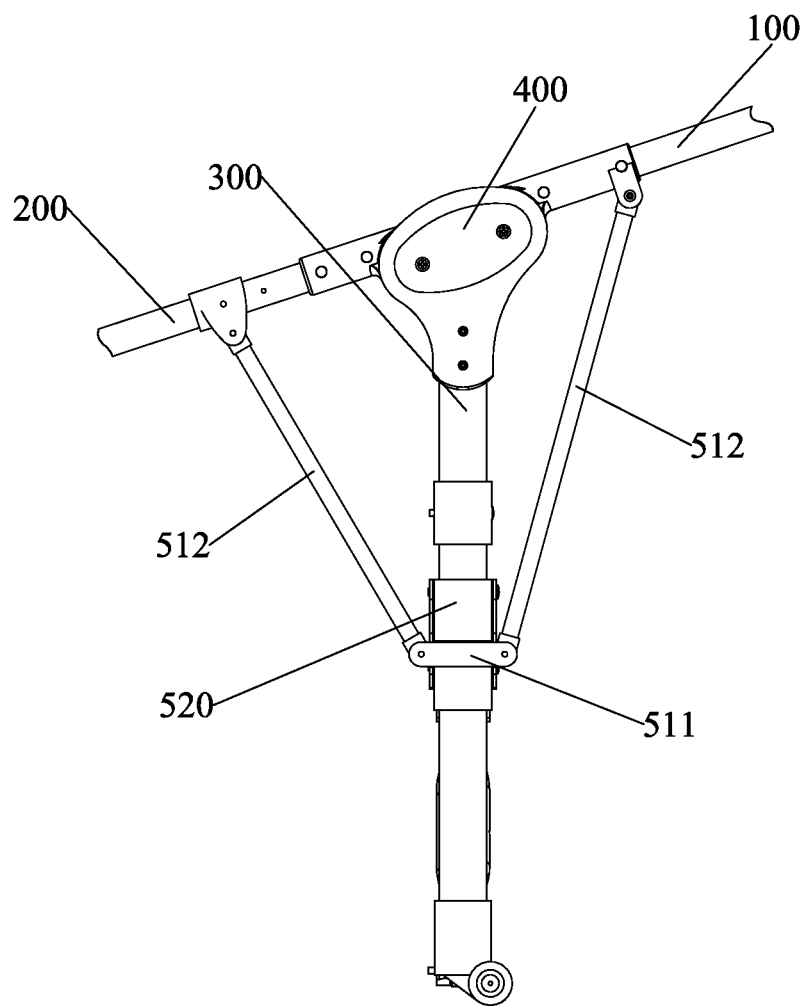
FIG. 5 a partial side view of the foldable stroller in an unfolded position according to one embodiment of the present invention.
Figure 6:
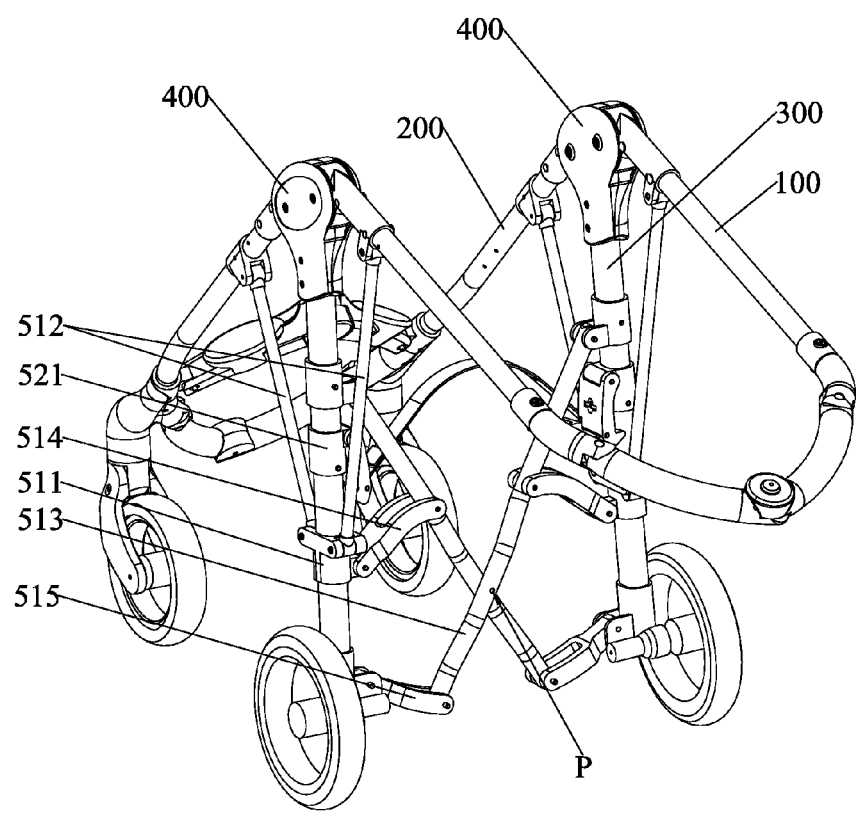
FIG. 6 is a perspective view of the foldable stroller during folding.
Figure 7:
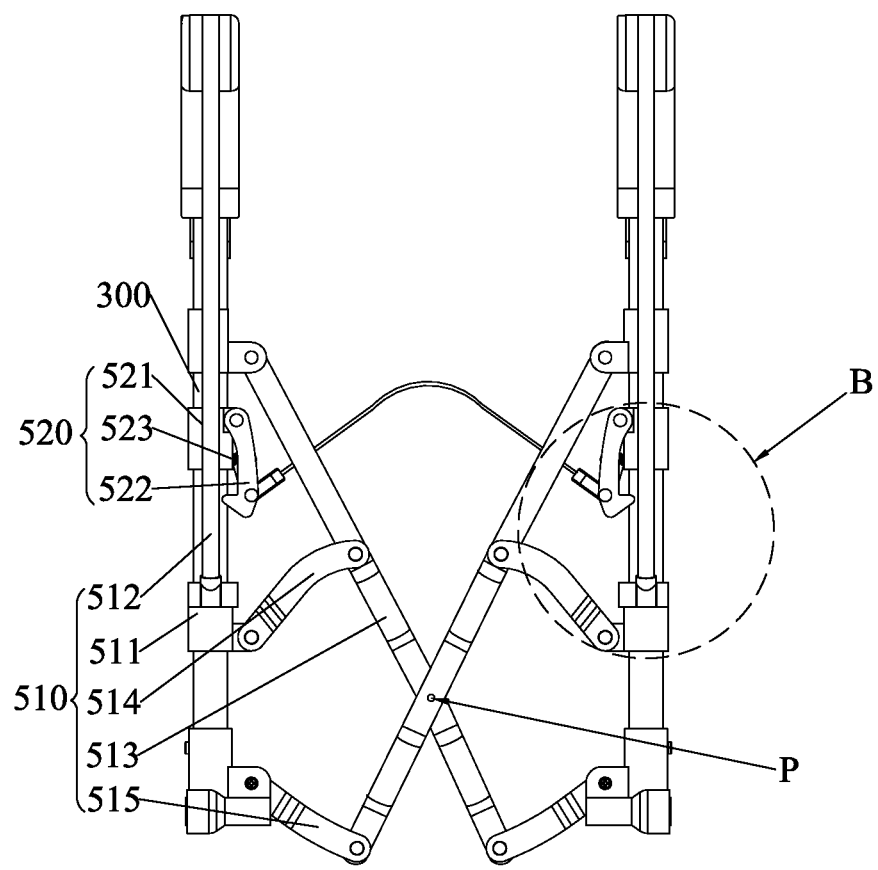
FIG. 7 is a partial front view of the foldable stroller during folding.
Figure 8:
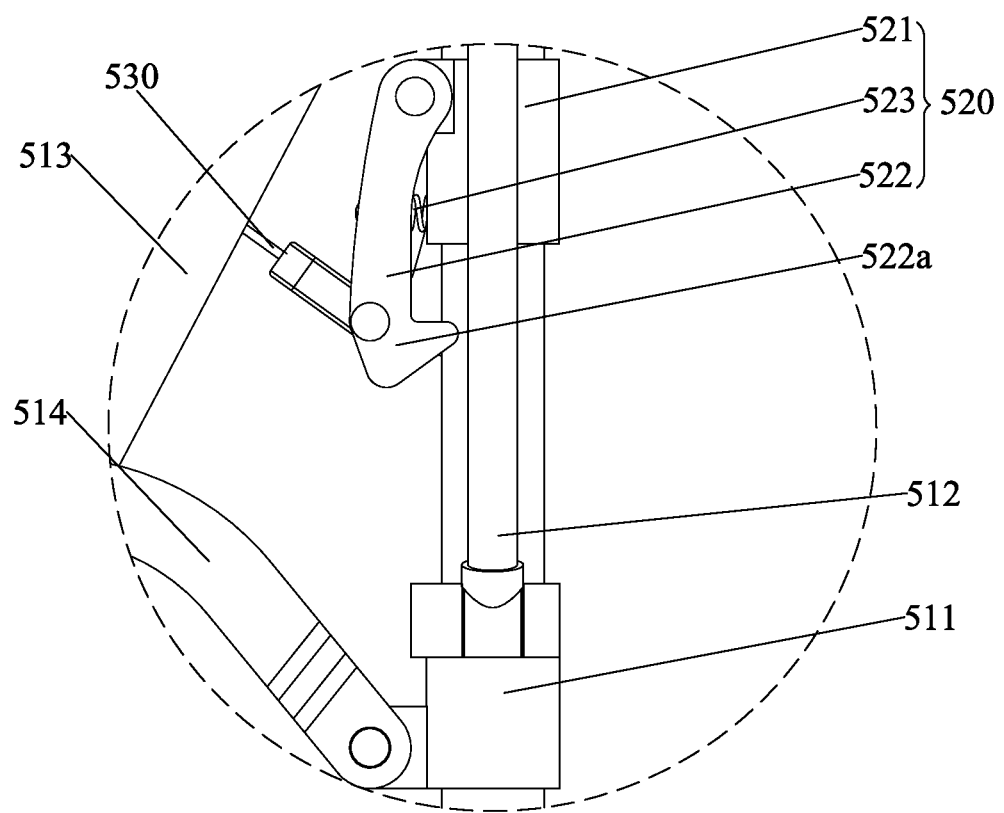
FIG. 8 is an enlarged view of the portion B in FIG. 7.
Figure 9:
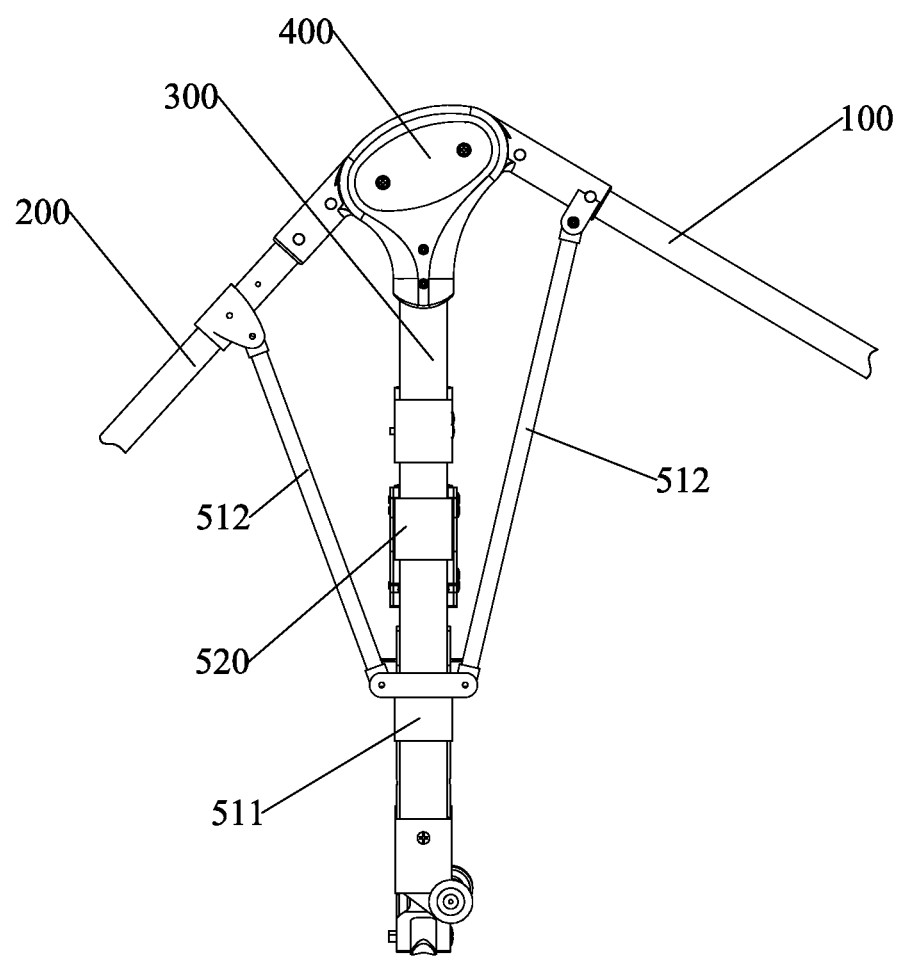
FIG. 9 is a partial side view of the foldable stroller during folding.

When the foldable stroller is in an unfolded position, the upper frame 100 and the lower frame 200 are unfolded relatively to the rear frame 300, and the upper and lower frames 100 and 200 are unfolded in the same straight line, as shown in FIGS. 3-5. Now the underside of the fastener 521 is pressed against the upside of the slider 511, and the latch 522 is pressed by the spring element 523, so that the hook 522*a* is pressed against the underside of the positioning block 511*c* to restrict the slider 511, thereby the foldable stroller in an unfolded position.

Figure 10:
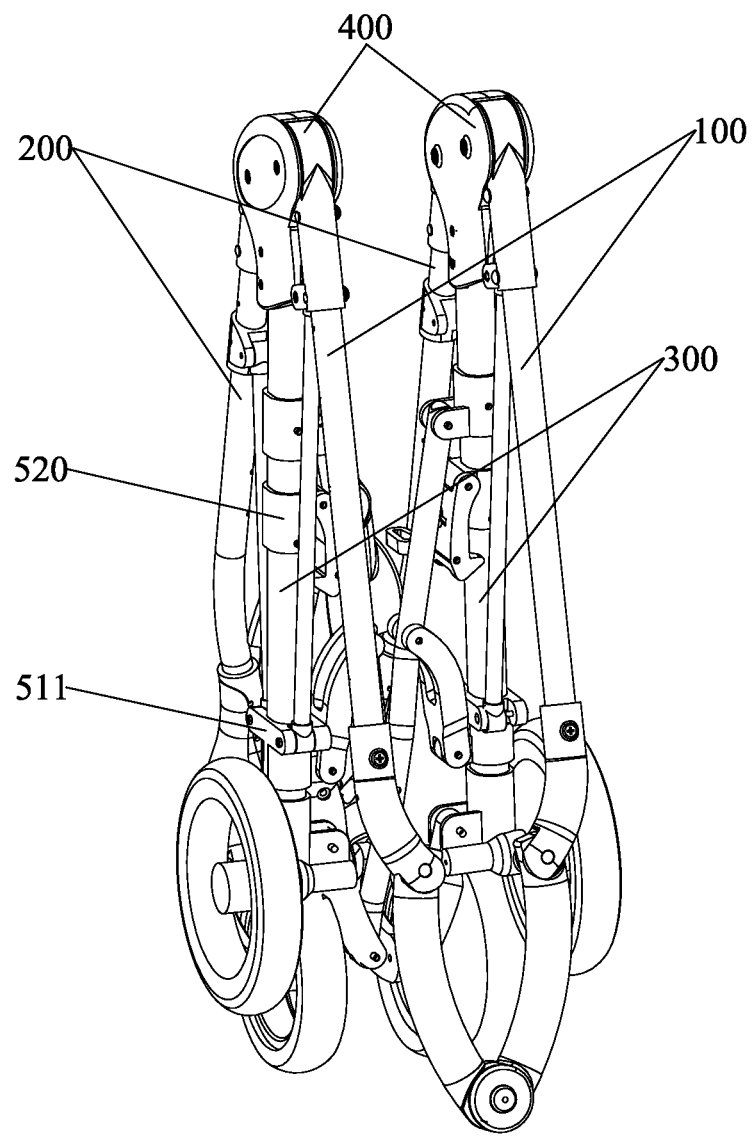
FIG. 10 is a perspective view of the foldable stroller in a folded position.
Figure 11:
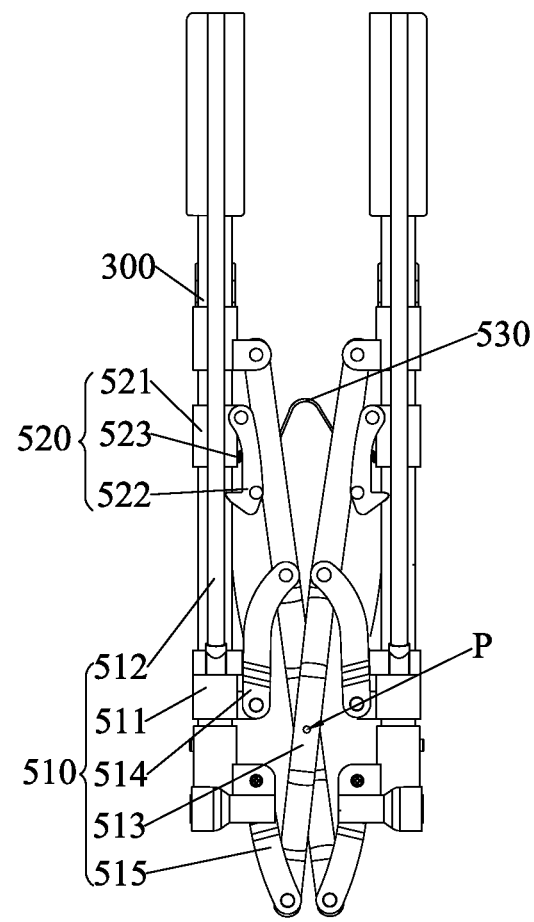
FIG. 11 is a partial front view of the foldable stroller in a folded position.
Figure 12:
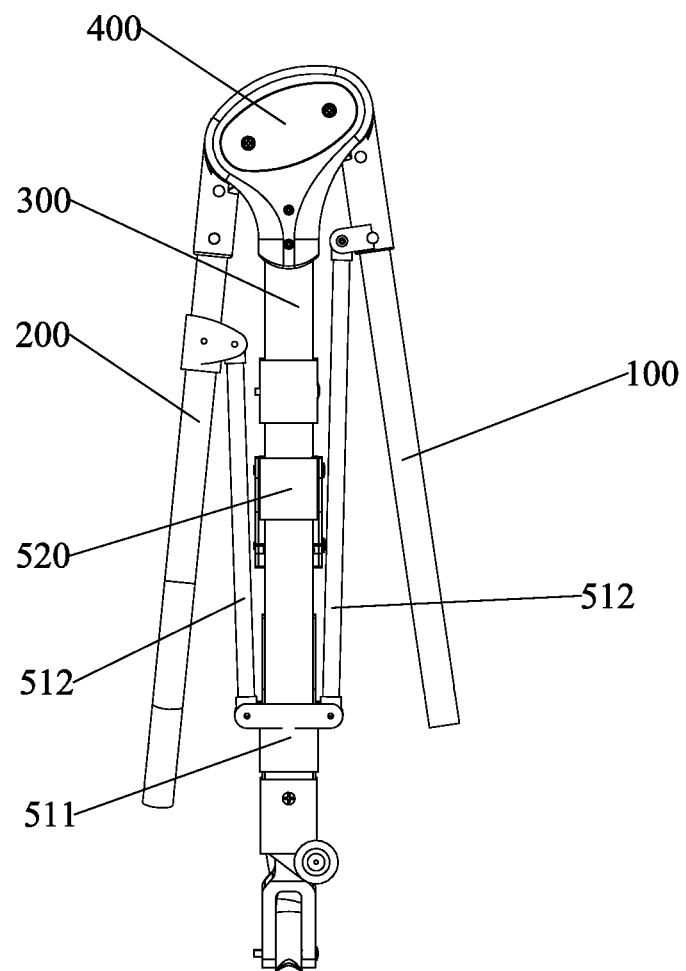
FIG. 12 is a partial side view of the foldable stroller in a folded position.

When the stroller is needed to fold, user pulls the actuator 530 in direction F as shown in FIG. 3, thus the latch 522 pivots away from the slider 511, meanwhile the spring element 523 is deformed which causes the hook 522*a* disengage the positioning block 511*c*, as shown in FIGS. 6-9. Under gravity of the upper and lower frames 100 and 200, both frames 100 and 200 are downwards pivoted about the rear frame 300 to fold, so that the stroller is folded in a vertical direction. Further, the upper frame 100 and the lower frame 200 are slid downwards relative to the rear frame 300 due to the slider 511 is actuated by the pull rod 512 to slide downwards, therefore the bracket 514 is pivoted relative to the slider 511 and the strut 513 to cause the two struts 513 approach to the rear frame 300, so that the struts 513 are folded together, thereby the stroller is folded in a horizontal direction. By this token, the foldable stroller is folded in both vertical and horizontal directions, and its folding position is shown in FIGS. 10-12.

In comparison with the prior art, the foldable stroller of the present invention can be kept in an unfolded position due to the sliding of the slider 511 is restricted by the engaging mechanism 520. When folds, the slider 511 is released by operating the engaging mechanism 520, so that the upper frame 100 and the lower frame 200 are pivoted to fold due to the gravity, thereby folding the stroller in the vertical direction; meanwhile, the slider 511 slides downwards under actuation of the pull rods 512, and accordingly the struts 513 are pivoted to fold, thereby folding the stroller in the horizontal direction. The structure of the present invention is simple and handy, only one engaging mechanism 520 is needed; and the stroller can be folded due to the gravity of the upper and lower frames 100 and 200, which needs small strength of the user.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A foldable stroller, comprising an upper frame, a lower frame, and a rear frame, with a lower end of the upper frame and an upper end of the lower frame pivotally connected to the rear frame respectively;
wherein the foldable stroller further comprises:
a linkage which comprises a slider which is directly connected to the rear frame and slidable along the rear frame, pull rods one of which is connected between the upper frame and the rear frame via the slider, another of which is connected between the lower frame and the rear frame via the slider, and struts whose middles are pivoted each other, with two ends of each strut connected to the rear frame, and the slider connected to the strut so as to actuate the struts to pivot each other, and the slider connected to the pull rods to actuate the upper frame and the lower frame to pivot each other; and
an engaging mechanism formed on the rear frame to restrict a sliding motion of the slider.

2. The foldable stroller according to claim 1, wherein the linkage further comprises a bracket which is pivotally connected between the slider and the strut.

3. The foldable stroller according to claim 2, wherein one end of each strut is pivotally connected to the rear frame, and the other end is pivotally connected to the rear frame via a pivoting rod, and the pivoting rod and bracket are symmetrical with a pivot point of the middles of the struts.

4. The foldable stroller according to claim 1, wherein the engaging mechanism comprises a fastener fixed on the rear frame and a latch pivotally connected to the fastener, and the latch is pivoted about the fastener to press against the slider.

5. The foldable stroller according to claim 4, wherein a spring element is set between the fastener and the latch, so as to keep a trend of the latch pressing against the slider.

6. The foldable stroller according to claim 4, wherein the fastener is located above the slider, an upper end of the latch is pivotally connected to the fastener, and a lower end of the latch is provided with a hook for hooking the slider to restrict its gravitational sliding motion.

7. The foldable stroller according to claim 4, further comprising an actuator connected to the latch to permit a gravitational sliding motion of the slider.

8. The foldable stroller according to claim 7, wherein the actuator is composed of flexible material.

9. A folding device, being applicable to a foldable stroller comprising an upper frame, a lower frame, and a rear frame, with a lower end of the upper frame and an upper end of the lower frame pivotally connected to the rear frame respectively, and the folding device further comprising:
a linkage which comprises a slider which is directly connected to the rear frame and slidable along the rear frame, pull rods one of which is connected between the upper frame and the rear frame via the slider, another of which is connected between the lower frame and the rear frame via the slider, and struts whose middles are pivoted each other, with two ends of each strut connected to the rear frame, and the slider connected to the strut so as to actuate the struts to pivot each other, and the slider connected to the pull rods to actuate the upper frame and the lower frame to pivot each other; and
an engaging mechanism formed on the rear frame to restrict a sliding motion of the slider.

10. The folding device according to claim 9, wherein the linkage further comprises a bracket which is pivotally connected between the slider and the strut.

11. The folding device according to claim 9, wherein the engaging mechanism comprises a fastener fixed on the rear frame and a latch pivotally connected to the fastener, and the latch is pivoted about the fastener to press against the slider.

12. A foldable stroller, comprising an upper frame, a lower frame, and a rear frame, with a lower end of the upper frame and an upper end of the lower frame pivotally connected to the rear frame respectively;
wherein the foldable stroller further comprises:
a linkage which comprises a slider connected to the rear frame, pull rods one of which is connected between the upper frame and the rear frame via the slider, another of which is connected between the lower frame and the rear frame via the slider, and struts whose middles are pivoted each other, with two ends of each strut connected to the rear frame, and the slider connected to the strut so as to actuate the struts to pivot each other; and an engaging mechanism formed on the rear frame to restrict a sliding motion of the slider;

wherein the linkage further comprises a bracket which is pivotally connected between the slider and the strut; one end of each strut is pivotally connected to the rear frame, and the other end is pivotally connected to the rear frame via a pivoting rod, and the pivoting rod and bracket are symmetrical with a pivot point of the middles of the struts.

* * * * *